(12) United States Patent
Tennent et al.

(10) Patent No.: US 6,732,551 B2
(45) Date of Patent: May 11, 2004

(54) METHOD AND FEEDSTOCK FOR MAKING SILICA

(75) Inventors: David L. Tennent, Campbell, NY (US); Joseph M. Whalen, Corning, NY (US)

(73) Assignee: Corning Incorporated, Corning, NY (US)

( * ) Notice: Subject to any disclaimer, the term of this patent is extended or adjusted under 35 U.S.C. 154(b) by 172 days.

(21) Appl. No.: 09/848,903

(22) Filed: May 4, 2001

(65) Prior Publication Data

US 2002/0162359 A1 Nov. 7, 2002

(51) Int. Cl.⁷ .................. C03B 19/06; C03B 37/018
(52) U.S. Cl. .................. 65/414; 65/417; 65/17.4
(58) Field of Search ................. 65/414, 417, 17.4

(56) References Cited

U.S. PATENT DOCUMENTS

| | | | |
|---|---|---|---|
| 4,402,720 A | 9/1983 | Edahiro et al. ............ 65/3.12 |
| 4,629,485 A | 12/1986 | Berkey ................... 65/3.11 |
| 4,714,589 A | 12/1987 | Auwerda et al. ............ 427/39 |
| 4,737,379 A | 4/1988 | Hudgens et al. ............ 427/39 |
| 4,877,938 A | 10/1989 | Rau et al. ............ 219/121.59 |
| 5,152,819 A | 10/1992 | Blackwell et al. ............ 65/3.12 |
| 5,288,518 A | 2/1994 | Homma ................... 427/255.1 |
| 5,800,877 A | 9/1998 | Maeda et al. ............ 427/535 |
| 5,876,798 A | 3/1999 | Vassiliev ................ 427/255.3 |
| 6,378,337 B1 * | 4/2002 | Brown et al. |
| 2002/0005051 A1 * | 1/2002 | Brown et al. |

FOREIGN PATENT DOCUMENTS

| | | | |
|---|---|---|---|
| WO | WO 98/27140 | 6/1998 | |
| WO | WO 99/02459 | 1/1999 | |
| WO | WO 02/21217 | 3/2002 | ............ G04F/9/00 |

OTHER PUBLICATIONS

The Chemistry of the Halogens and the Noble Gases, Problems, pp 790–791.
Carbon, Chapter 8—Cyanides and Other Carbon–Nitrogen Compounds, pp. 336–343.

* cited by examiner

*Primary Examiner*—Christopher A. Fiorilla
(74) *Attorney, Agent, or Firm*—Adenike A. Adewuya; Randall S. Wayland

(57) ABSTRACT

A method for making silica includes delivering a silica precursor comprising a pseudohalogen to a conversion site and passing the silica precursor through a flame to produce silica soot.

38 Claims, 4 Drawing Sheets

METHOD AND FEEDSTOCK FOR MAKING SILICA

BACKGROUND OF INVENTION

1. Field of the Invention

The invention relates generally to methods for making silica. In particular, the invention relates to a hydrogen-free and chlorine-free precursor that can be oxidized to produce silica.

2. Background Art

Silica is a particularly suitable material for forming the core and cladding of an optical waveguide. For the core of the optical waveguide, silica may be doped with a small amount of other materials, such as titanium oxide, tin oxide, phosphorous oxide, aluminum oxide, and germanium oxide, to slightly increase the refractive index of the core above that of the cladding. In other fibers the core is pure silica and the cladding is down doped with fluorine. Optical waveguides exhibiting very low losses are generally formed by vapor deposition processes. In one such process, a silica precursor is introduced into a conversion flame to produce fine particles, called "soot." A dopant material, such as $GeCl_4$, may also be introduced into the conversion flame along with the silica precursor (e.g., $SiCl_4$). The soot is deposited on an outside surface of a rotating mandrel to form a soot preform. After an appropriate diameter of the core of the waveguide is reached, the mandrel is removed from the soot preform, leaving a hole in the soot preform. The soot preform is then sintered to form a consolidated glass draw preform. Next, the preform is drawn to close the hole and stretch the preform into a core cane of constant diameter. The core cane is then cut into segments, each of which becomes a deposition surface for cladding. The core cane is overclad with silica soot to an appropriate diameter and again consolidated. The resulting preform is then drawn until an optical waveguide having the desired dimensions is formed. For multi-segment fiber profiles, such as W profiles or ringed profiles, this process may include several steps of deposition, consolidation, and core-cane formation, with the dopants being provided to accomplish the desired refractive index for each segment.

Silica has also found a variety of uses in applications requiring transmission of ultraviolet radiation, particularly at wavelengths below 300 nm. One such application is in microlithography systems, which are employed in the production of integrated circuits. These systems use multiple fused silica lenses, called stepper lenses, to transmit radiation from excimer lasers to photosensitized silicon wafers. Current microlithography systems use 248-nm radiation (KrF laser) or 193-nm radiation (ArF laser) to print patterns with width as small as 0.25 µm. More advanced microlithography systems using 157-nm radiation ($F_2$ laser) are actively under development and are expected to produce patterns with even smaller widths. Microlithography systems require lenses made from high-purity fused silica because impurities in the lenses can distort the images projected onto the wafers as well as decrease transmission of the lenses. High-purity fused silica is typically produced by the boule process. The conventional boule process involves passing a silica precursor into a flame of a burner to convert the silica precursor to soot. The soot is then directed downwardly to a bait and immediately consolidated into dense, transparent, bulk glass, commonly called a "boule." The boule can be used individually to fabricate stepper lenses as well as other optical elements such as photomasks.

It has been found that the selection of the silica precursor used in the production of silica is as important as the design of the equipment used to produce the silica. For a long time, the standard feedstock used in the production of silica was $SiCl_4$. $SiCl_4$ was chosen because it yielded large amounts of vapors at low temperatures. Flame combustion of $SiCl_4$, however, has a drawback because it produces chlorine gas as a by-product. If the conversion flame is provided by combustion of a hydrogen-containing fuel, which is usually the case, hydrogen chloride gas is also produced as a by-product. Moreover, large amounts of water ($H_2$, OH, and $H_2O$) are formed. These gases are environmentally unfriendly and require considerable care for their disposal. In addition, chlorine has been found to decrease transmission at 157 nm. This makes chlorine-based silica precursors unsuitable for making, for example, fused silica lenses for 157 nm applications.

Hydrogen-containing organic compounds such as octamethlytetrasiloxane and silane have been identified as satisfactory chlorine-free precursors for producing silica. However, flame combustion of these precursors using $CH_4$ as the fuel also inherently results in the silica containing residual water, i.e., OH, $H_2$, and $H_2O$. In optical waveguides and 157-nm applications it is preferable that the silica is substantially free of residual water. For optical waveguides, residual water in the silica results in high transmission loss in the optical waveguide at the wavelengths of interest. In preparation of fluorine-doped soot preform for optical waveguides, residual water is detrimental becomes it promotes fluorine migration. Water is known to reduce transmission of fused silica at wavelengths below 185 nm. Therefore, there is a strong interest in a method of producing silica that is substantially free of water and chlorine.

SUMMARY OF INVENTION

In one embodiment, the invention relates to a method for making silica which comprises delivering a silica precursor comprising a pseudohalogen to a conversion site and passing the silica precursor through a flame to produce silica soot.

In another embodiment, the invention relates to a method for making germania-doped silica which comprises delivering a silica precursor comprising a pseudohalogen and a germania precursor comprising a pseudohalogen to a conversion site and passing the silica precursor and the germania precursor through a flame to produce the germania-doped silica.

In another embodiment, the invention relates to a method for making silica which comprises delivering a silica precursor comprising a pseudohalogen and an oxidant inside a heated tube to form silica and depositing the silica on an inner surface of the tube.

In another embodiment, the invention relates to a method for making fused silica which comprises delivering a silica precursor comprising a pseudohalogen to a conversion site, passing the silica precursor through a flame to produce silica soot, and depositing the silica soot onto a deposition surface, wherein the silica soot is immediately consolidated into glass.

In another embodiment, the invention provides an optical waveguide preform feedstock which comprises a pseudohalogen.

In another embodiment, the invention provides an optical waveguide preform feedstock which comprises a pseudohalogen capable of being converted to germania oxide.

In another embodiment, the invention relates to a method for manufacturing an optical fiber preform which comprises delivering a silica precursor comprising a pseudohalogen to a conversion site and heating the silica precursor to produce silica.

Other features and advantages of the invention will be apparent from the following description and the appended claims.

DETAILED DESCRIPTION

Embodiments of the invention use silicon compounds containing pseudohalogens as a replacement for the chloride-based and hydrogen-containing organic feedstock that are often oxidized by flame hydrolysis to produce silica. Pseudohalogens act much like halogens in their chemistry but have no connection to any element in Group 17 (formerly known as Group VII) in the periodic table. Typical examples of pseudohalogens include, but are not limited to, —CN (cyano), —NC (isocyano), —OCN (cyanato), —NCO (isocyanato), —SCN (thiocyanato), —NCS (isothiocyanato), —SeCN (selenocyanato), and —NCSe (isoselenocyanato). Pseudohalogens have the advantage of being able to be oxidized without production of water or inclusion of chlorine in the silica.

Toxicity of the silicon compounds is based on the hydrolysis products of silica and the resulting acid. For example, cyano and isocyano compounds would result in cyanide gas in the waste stream, which must be carefully disposed of to prevent formation of poisonous hydrogen cyanide gas. Thiocyanato and isothiocyanato compounds would result in $SO_x$ in the waste stream, which would require scrubbing. However, cyanato and isocyanato compounds are much less toxic than cyano compounds and would have fewer environmental concerns after combustion, as illustrated by equation (1) below, especially when a substantially hydrogen-free fuel such as CO is used.

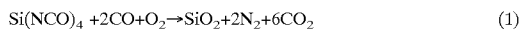

$$Si(NCO)_4 + 2CO + O_2 \rightarrow SiO_2 + 2N_2 + 6CO_2 \quad (1)$$

In a preferred embodiment of the invention, tetraisocyanatosilane (TICS), which is represented by the chemical formula $Si(NCO)_4$, is the feedstock used in vapor deposition processes for optical waveguide applications or fused silica boule process.

Figure 1A:
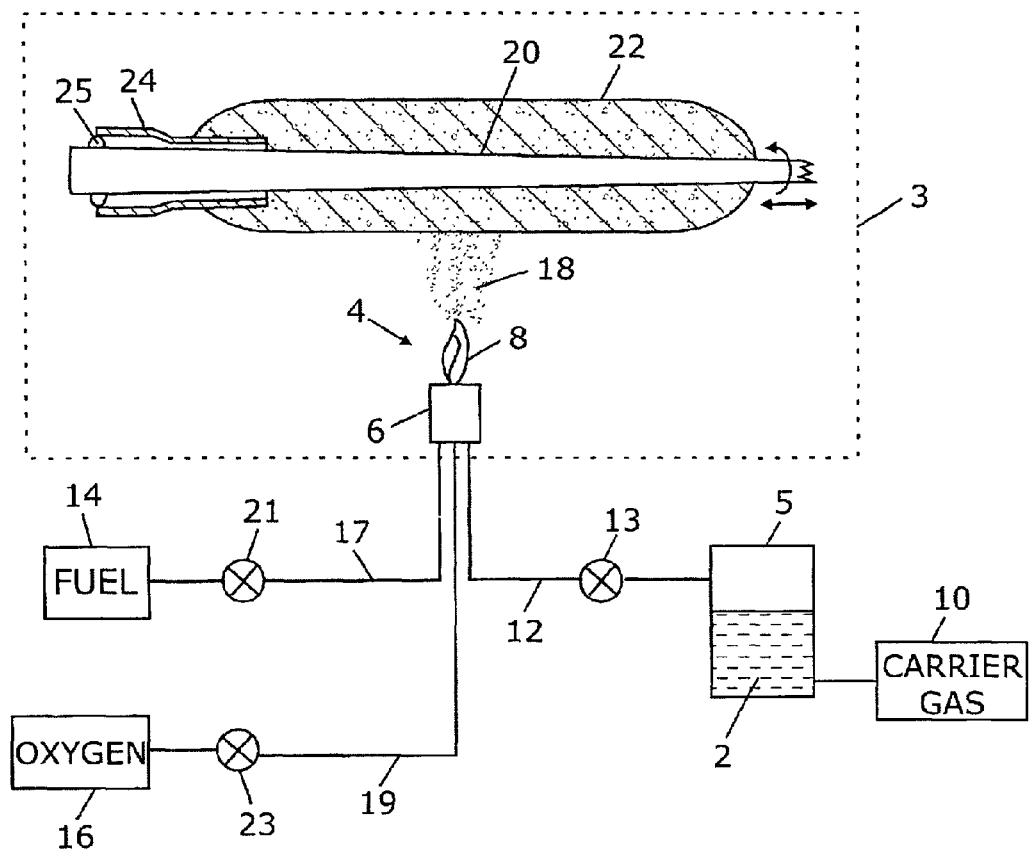
FIG. 1A is a schematic representation of an OVD process for producing an optical waveguide preform.

Various embodiments of the invention will now be described with reference to the accompanying drawings. FIG. 1A is an exemplary schematic representation of an outside vapor deposition (OVD) process for producing an optical waveguide preform according to an embodiment of the invention. The process for producing the optical waveguide preform 22 includes delivering a silicon compound containing a pseudohalogen 2 to a conversion site 4.

Preferably, the conversion site 4 includes at least one burner 6 which produces a conversion flame 8. The burner 6 produces the conversion flame 8 by burning a fuel 14 and oxygen 16. The fuel 14 and oxygen 16 may be separately delivered to the burner 6 through fume lines 17 and 19, respectively. Mass flow controllers 21 and 23 are provided to control the rate at which fuel 14 and oxygen 16 are delivered to the burner 6. Alternatively, the fuel 14 and oxygen 16 may be mixed together in a premixing chamber (not shown). The fuel/oxygen mixture can then be delivered to the burner 6.

The oxygen 16 supplied to the burner 6 may be in its pure state or may be admixed with inert gases such as nitrogen, argon, helium, or carbon dioxide. To provide a hydrogen-free environment for the OVD process, the fuel 14 preferably should not contain hydrogen or water. A suitable fuel for this purpose is carbon monoxide. To use carbon monoxide, a precursor which burns exothermically is desired because of the somewhat lower flame temperature as compared to, for example, $CH_4$. Other examples of fuels include, but are not limited to, those containing $(CN)_2$, $D_2$, or $(CNO)_2$. In one embodiment, the silicon compound containing a pseudohalogen 2 is TICS. TICS burns exothermically and is expected to be a suitable precursor for use with carbon monoxide.

In one embodiment, a liquid feedstock of TICS is vaporized in a container 5, which may be a vaporizer, bubbler, or other similar equipment for vaporizing the material. An inert carrier gas 10 is passed through the TICS vapors in the container 5. The inert carrier gas 10 could be any nonflammable gas such as nitrogen, noble gases (argon, helium, neon, krypton, xenon), or fluorinated gases. Typical fluorinated gases are $CF_4$, chlorofluorocarbons, e.g., $CF_xCl_{4-x}$, where x ranges from 1 to 3, $NF_3$, $SF_6$, and $SiF_4$. It should be noted that chlorofluorocarbons should be avoided if a chlorine-free process is desired. The inert carrier gas 10 entrains the TICS vapors and carries the vapors to the burner 6 through tubing 12. Preferably, the tubing 12 is heated to prevent condensation. Another stream of inert gas (not shown), e.g., nitrogen, may be brought in contact with the TICS vapors to prevent saturation of the vapors. A mass flow controller 13 controls the rate at which the vapors are delivered to the burner 6.

At the conversion site 4, the TICS vapors pass through the conversion flame 8 to form silica-containing soot 18, which is deposited on a mandrel 20. Typically, the mandrel 20 is a tapered cylindrical member made of an inert material such as alumina. A glass handle 24 is provided over the mandrel 20 at one end and is used for gripping the preform throughout the process. A spacer 25 holds the handle 24 relative to the mandrel 20 prior to depositing the soot 18 on the mandrel 20. To allow for uniform deposition, the mandrel 20 is rotated and translated axially as layers of the soot 18 are deposited. Optionally, the burners may be traversed along the axial axis of the mandrel 20. To maintain a substantially hydrogen- and water-free environment, the conversion site 4 and mandrel 20 is preferably enclosed in an atmosphere that is free of moisture and hydrogen gas, such as dry air or dry inert gas (e.g., argon, krypton, helium, neon, xenon, or nitrogen), as depicted by the dotted box 3 around the preform 22 and flame 8. Combustion of TICS produces NCO—, which will form HNCO with hydrogen. However, HNCO can be decomposed to form $CO_2$ and $NH_3$ in water, thus making the byproduct easy to scrub.

Figure 1B:
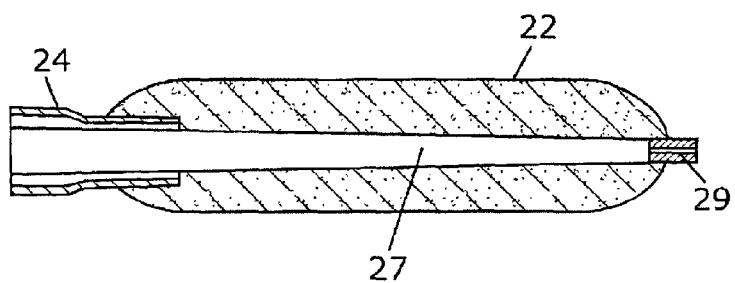
FIG. 1B is a partial cross-sectional side view of a soot preform.

The soot 18 is deposited on the mandrel 20 until the appropriate diameter of the optical waveguide core, or soot preform 22, is formed. After deposition, the mandrel 20 is removed from the soot preform 22. Referring to FIG. 1B, removal of the mandrel (20 in FIG. 1A) leaves a hole 27 extending along an axial length of the soot preform 22. A plug-like member 29 made of pure silica glass is inserted at one end of the hole 27, i.e., the end that does not include the handle 24. The plug-like member 29 will close the end of the preform upon consolidation. The soot preform 22 is inserted into and held in a consolidation furnace (not shown) and fully consolidated. It should be noted that because the soot preform is produced in a hydrogen- and water-free environment, a chlorine treatment to remove residual water may not be necessary before full consolidation. Preferably, the soot perform 22 is also transported to the consolidation furnace (not shown) in a substantially water-free environment.

The consolidated preform is drawn to close the hole 27 and stretched into core cane using conventional fiber draw techniques. The core cane is then cut into segments, each of which becomes a deposition surface for a silica overclad or further segments of the core, preferably including a F dopant formed by intorducing the aforementioned F-containing compounds. The silica overclad or additional segments may be formed using the OVD process described above, except that the mandrel 20 will now be replaced with the core cane segment. The overclad core cane segment is finally consolidated and drawn into an optical waveguide. In the core where the cladding is F-doped, the dopant may be added during deposition or, more preferably, during consolidation as is described in U.S. Pat. No. 4,629,485 issued to Berkey. For multi-segment fiber profiles, such as W-profiles and ring profiles, the process of forming the optical waveguide may include several steps of soot deposition, consolidation, and core cane formation. For example, the overclad core cane segment can be drawn using conventional fiber draw techniques, cut into segments, and then used as a deposition substrates for the next segment.

Figure 2:
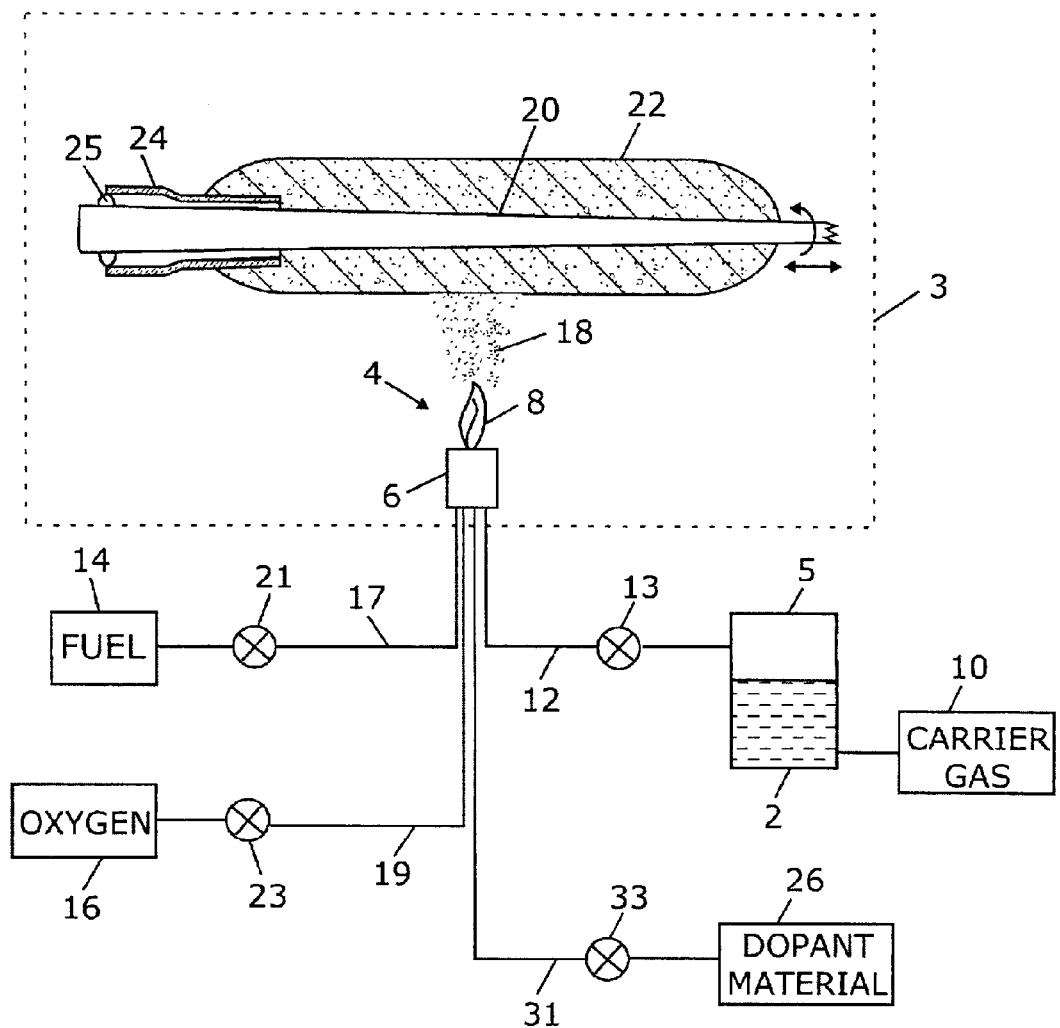
FIG. 2 illustrates a process for producing doped silica soot.

The soot 18 may be doped with materials, such as F, B, Al, Ge, Sn, Ti, P, Se, Er, S, Ca, Ba, Y, Yb, Ta, La, Sb, and Bi, during the OVD process or consolidation to create different index profiles. Most fiber compositions require $GeO_2$ in the core to provide a higher index than the clad. FIG. 2 illustrates a process for producing doped silica soot in deposition. The process is similar to the one described in FIG. 1A, except that an additional delivery system is needed for delivering the dopant material 26 to the burner 6. In the illustration, a vaporous stream of TICS 2 (or other silicon compound containing a pseudohalogen) and the dopant material 26 are separately delivered to the burner 6 through lines 12 and 31, respectively. Mass flow controllers 13, 33 are provided to control the rate at which the vaporous reactants 2, 26 are delivered to the burner 6. In alternate embodiments, the TICS 2 vapors may be mixed with the dopant material 26 prior to being delivered to the burner 6. Preferably, the dopant material 26 is a gaseous or vaporizable material. To maintain the hydrogen-free environment, the dopant material 26 is preferably free of hydrogen. Similarly, to maintain a chlorine-free environment, the dopant material 26 is preferably free of chlorine to maximize $GeO_2$ retention and/or prevent fluorine migration.

To produce fluorine-doped silica soot, for example, the dopant material 26 is a fluorine-containing compound, which may be any gaseous or easily vaporized material that does not contain hydrogen or water, e.g., $CF_4$, $CF_6$, $NF_3$, $SF_6$, $SiF_4$, and so forth. The fluorine-containing compound and TICS 2 (or other silicon compound containing a pseudohalogen) are delivered to the conversion site 4 in vapor form to produce fluorine-doped silica soot, which is then deposited on the mandrel 20 or cone cane as previously described.

To produce germania-doped soot, prior art processes typically use chloride-based compounds, such as $GeCl_4$, or hydrogen-containing compounds, such as $GeH_4$, as germania dopant. To maintain a substantially hydrogen-free and chlorine-free atmosphere, a hydrogen-free and chlorine-free germania dopant is desired. In one embodiment of the invention, a germanium compound containing a pseudohalogen is used as a replacement for the chloride-based or hydrogen-containing germania dopant. One suitable example of such a material is germanium isocyanate, represented by the chemical formula $Ge(NCO)_4$. As in the case of TICS, a liquid feedstock of germanium isocyanate is converted into vapor form and then delivered to the conversion site 4 together with TICS. Upon passing through the conversion flame, the $Ge(NCO)_4$ vapors are oxidized to germania, as illustrated by equation (2) below, and TICS is oxidized to silica.

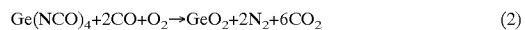

$$Ge(NCO)_4 + 2CO + O_2 \rightarrow GeO_2 + 2N_2 + 6CO_2 \qquad (2)$$

The germania and silica particles are then deposited on the mandrel 20, as previously described, to form germania-doped silica soot. Good germania deposition rates are thought to be achievable with the combination of TICS and $Ge(NCO)_4$. Good deposition rates are also achievable by using a pseudohalogen containing silica precursor, e.g., TICS, $GeCl_4$, and a dry fuel such as CO (see equation (3) below).

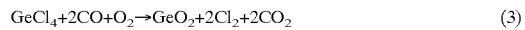

$$GeCl_4 + 2CO + O_2 \rightarrow GeO_2 + 2Cl_2 + 2CO_2 \qquad (3)$$

Figure 3:
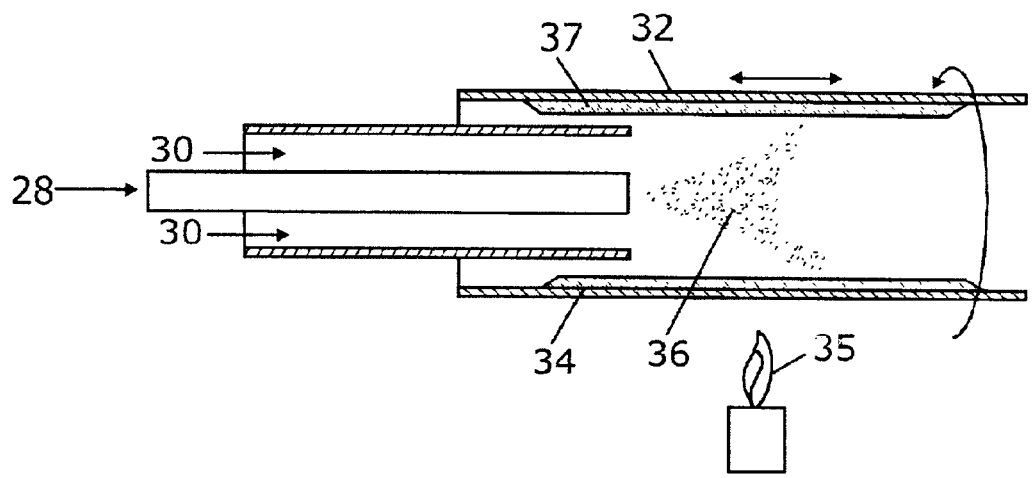
FIG. 3 is a partially cross-sectioned frontal view of a MCVD process for producing an optical waveguide preform.

FIG. 3 is an exemplary schematic representation of a modified chemical vapor deposition (MCVD) process for producing an optical waveguide preform using a silicon compound containing a pseudohalogen, e.g., TICS. TICS vapors 28 and oxygen 30 are supplied into a silica glass tube 32 to form soot 36, which is deposited on an inner wall 34 of the tube 32. To allow for uniform deposition on the inner wall 34, the tube 32 is rotated and translated axially as the soot 36 is deposited. The tube 32 is also heated to vitrify the soot into glass 37. Preferably, the tube 32 is heated with a hydrogen-free flame 35. A doped glass may be produced by supplying a dopant material, such as a fluorine-containing compound or germania isocyanate, into the tube 32 along with the TICS vapors 28 and oxygen 30. The flow of gases is controlled by mass flow controllers (not shown). By adjusting the relative flow of the various reactants, several layers including the cladding layer with different indices of refraction can be obtained. After the deposition process is complete, the tube 32 is heated and collapsed into a rod. The rod preform is then drawn into a fiber using conventional fiber draw techniques.

Figure 4:
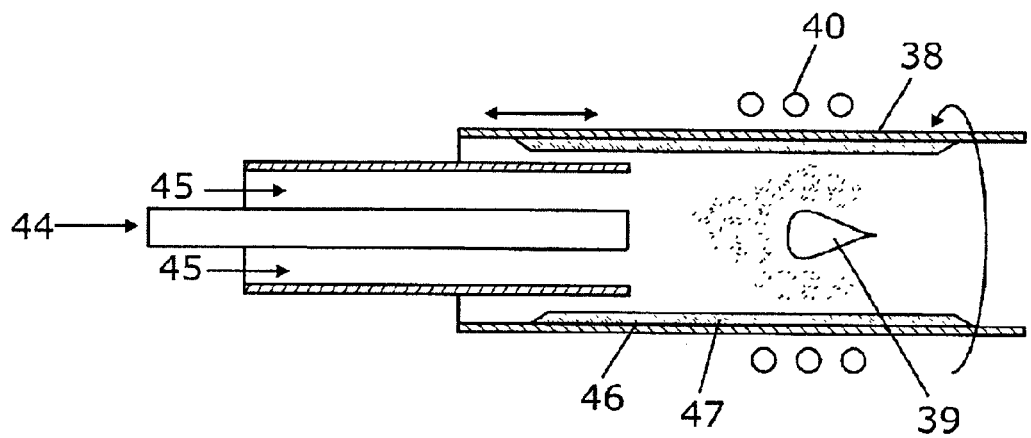
FIG. 4 is a partially cross-sectioned frontal view of a PCVD process for producing an optical waveguide preform.

FIG. 4 is an exemplary schematic representation of a plasma chemical vapor deposition (PCVD) process for producing an optical waveguide preform according to an embodiment of the invention. In this process, a plasma flame 39 is formed within a silica tube 38. The plasma flame 39 is formed, for example, by inserting the silica tube 38 into a high-frequency coil 40 and supplying plasma-generating gases (not shown), such as oxygen or argon, into the silica tube 38. Optionally, a microwave generator may be employed to generate the plasma flame 39. TICS 44 (or other silicon compound containing a pseudohalogen) and oxygen (or oxidant) 45 are then injected into the plasma flame 39. TICS 44 is oxidized into silica in the plasma flame 39. The silica is deposited on the inner wall 46 of the tube 38 as transparent glass 47. The silica tube 38 is rotated and translated as the glass 47 is formed on the inner wall 46.

After forming the desired thickness of glass, the silica tube 38 is heated and collapsed into a rod which can be drawn into a fiber using conventional fiber draw techniques. As in previous processes, a doped silica can be produced by supplying a dopant material, such as germania isocyanate and/or a fluorine-containing compound, along with TICS 44 into the plasma flame 39. Also, other silica precursor containing a pseudohalogen can be used in place of TICS 44. Moreover, other dopants may be employed to form other segments.

Figure 5:
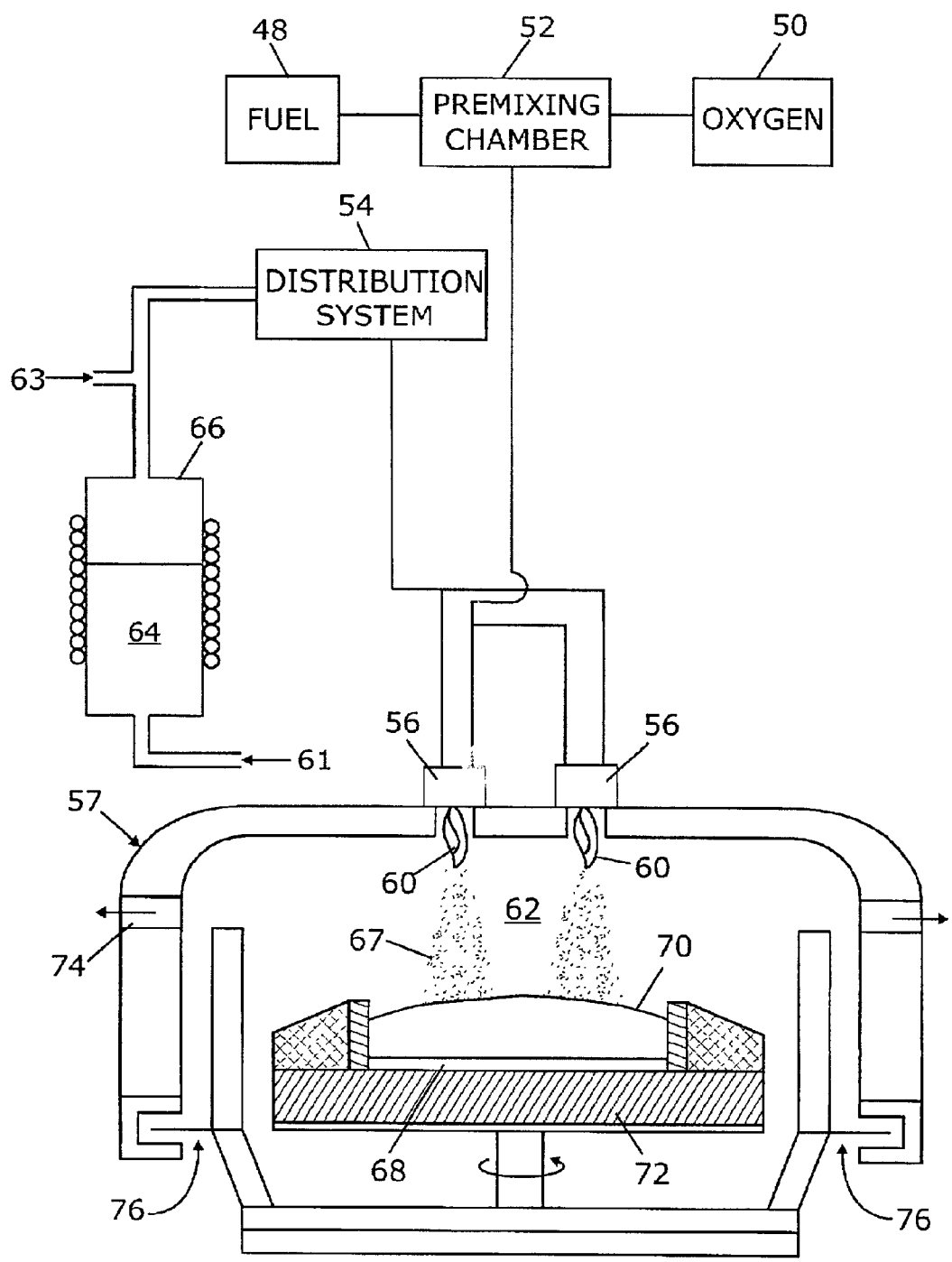
FIG. 5 is a schematic representation of a boule process for producing fused silica.

FIG. 5 is an exemplary schematic representation of a boule process for producing high purity fused silica using a silicon compound containing a pseudohalogen, e.g., TICS. In the process, fuel 48 and oxygen 50 are mixed in a premixing chamber 52. The fuel/oxygen mixture is then transferred to burners 56 mounted at the crown of a furnace 57. To maintain a substantially hydrogen-free atmosphere, the fuel 48 is preferably hydrogen-free. As previously mentioned, a suitable fuel for this purpose is carbon monoxide. The burners 56 ignite the fuel/oxygen mixture to produce flames 60, which typically preheat the deposition cavity 62 to a desired temperature. A liquid feedstock of TICS 64 (or some other silicon compound containing a pseudohalogen) is vaporized in a container 66. An inert carrier gas 61 entrains the TICS vapors and carries the vapors to a distribution system 54, which distributes the vapors to the burners 56. As also shown in the figure, an inert gas 63 may be brought in contact with the TICS vapors to prevent saturation.

The TICS 64 vapors pass through the flames 60 and are converted to soot 67. The soot 67 is deposited on a substrate 68 (typically made of silica) and immediately consolidated into dense glass 70. Consolidation typically occurs at roughly 1550° C. or greater. To ensure homogeneity, the substrate 68 is typically rotated and oscillated as the silica soot is deposited. Spurious soot formed during soot deposition is removed via draft ports 74 which are connected to an exhaust system (not shown). The furnace is drafted using a purge gas 76. Preferably, the purge gas 76 is an inert gas, such as nitrogen, so that a substantially hydrogen-free environment is maintained. Generally, it is desirable to provide a pressurized atmosphere in the deposition cavity 62 greater than an atmospheric pressure outside of the deposition cavity 62.

Those skilled in the art will appreciate that various modifications to the embodiments described above are possible which are within the scope of the invention. For example, in the vapor deposition processes, the soot may be deposited on a planar substrate to make a planar waveguide. For the boule process, a dopant material, such as a hydrogen- and chlorine-free titania precursor, may be passed through the conversion flame along with the silica precursor to produce doped silica soot. The silica precursor of the present invention may also be used in other vapor deposition processes such as vapor-axial deposition process, wherein a column of soot preform is grown. In general, the invention can be used where the deposition and consolidation occur separately or simultaneously.

The invention described herein can make soot preforms or glass boules that are substantially free of hydrogen (or residual water) and chlorine. As previously discussed, such soot preforms and glass boules are useful in many applications, such as optical waveguide fabrication and lens and photomask fabrication.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for making silica, comprising:
   delivering a silica precursor comprising a pseudohalogen to a conversion site; and
   passing the silica precursor through a flame to produce silica soot.

2. The method of claim 1, wherein the pseudohalogen is selected from a group consisting of cyano, isocyano, cyanato, isocyanato, thiocyanato, isothiocyanato, selenocyanato, and isoselenocyanato.

3. The method of claim 1, wherein the silica precursor comprises silicon tetraisocyanate.

4. The method of claim 1, wherein the silica precursor is delivered to the conversion site in vapor form.

5. The method of claim 1, wherein the flame is formed by combustion of a fuel.

6. The method of claim 5, wherein the fuel comprises $CH_4$.

7. The method of claim 5, wherein the fuel comprises one selected from a group consisting of CO, $(CN)_2$, $D_2$, $(CNO)_2$, and combinations thereof.

8. The method of claim 1, wherein the flame is a plasma.

9. The method of claim 1, further comprising delivering to the conversion site a compound capable of being converted to an oxide of at least one member of a group consisting of B, Al, Ge, Sn, Ti, P, Se, Er, S, Ca, Ba, Y, Yb, Ta, La, Sb, and Bi.

10. The method of claim 1, further comprising delivering to the conversion site a compound capable of being converted to germania oxide.

11. The method of claim 10, wherein the compound comprises $GeCl_4$.

12. The method of claim 10, wherein the compound comprises a pseudohalogen.

13. The method of claim 10, wherein the compound comprises germanium isocyanate.

14. The method of claim 1, further comprising an environment at the conversion site that is free of chlorine.

15. The method of claim 1, further comprising delivering a fluorine-containing compound to the conversion site and passing the fluorine-containing compound through the flame to form silica soot doped with fluorine.

16. The method of claim 15, wherein the silica precursor and the fluorine-containing compound are delivered to the flame in gaseous form.

17. The method of claim 16, wherein the fluoride-containing compound is selected from the group consisting of $CF_4$, $CF_4Cl_{4-x}$, where x ranges from 1 to 3, $NF_3$, $SF_6$, $SiF_4$, $C_2F_6$, and $F_2$.

18. The method of claim 16, wherein the silica precursor is delivered in a gas stream comprising an inert gas.

19. The method of claim 1, further comprising depositing the silica soot on a deposition surface.

20. The method of claim 19, further comprising consolidating the silica soot into glass.

21. The method of claim 20, wherein the deposition surface is provided by a rotating mandrel.

22. The method of claim 21, further comprising drawing the glass into a core cane.

23. The method of claim 19, wherein depositing the silica soot on a deposition surface comprises simultaneously consolidating the silica soot into glass.

24. A method for making germania-doped silica comprising:

delivering a silica precursor comprising a pseudohalogen and a germania precursor comprising a pseudohalogen to a conversion site; and passing the silica precursor and the germania precursor through a flame to produce the germania-doped silica.

25. The method of claim 24, wherein the pseudohalogen is selected from a group consisting of cyano, isocyano, cyanato, isocyanato, thiocyanato, isothiocyanato, selenocyanato, and isoselenocyanato.

26. The method of claim 24, wherein the silica precursor comprises silicon tetraisocyanate.

27. The method of claim 24, wherein the germania precursor comprises germanium isocyanate.

28. A method for making fused silica, comprising:

delivering a silica precursor comprising a pseudohalogen to a conversion site;

passing the silica precursor through a flame to produce silica soot; and depositing the silica soot onto a deposition surface, wherein the silica soot is immediately consolidated into glass.

29. The method of claim 28, wherein the pseudohalogen is selected from a group consisting of cyano, isocyano, cyanato, isocyanato, thiocyanato, isothiocyanato, selenocyanato, and isoselenocyanato.

30. The method of claim 28, wherein the silica precursor comprises silicon tetraisocyanate.

31. The method of claim 28, wherein the flame is formed by combustion of a fuel.

32. The method of claim 31, wherein the fuel comprises carbon monoxide.

33. A method for manufacturing an optical fiber preform, comprising:

delivering a silica precursor comprising a pseudohalogen to a conversion site; and heating the silica precursor to produce silica.

34. The method of claim 33, wherein the silica precursor comprises tetraisocyanate.

35. The method of claim 33, wherein the pseudohalogen is selected from a group consisting of cyano, isocyano, cyanato, isocyanato, thiocyanato, isothiocyanato, selenocyanato, and isoselenocyanato.

36. The method of claim 33, further comprising a dopant compound.

37. The method of claim 36, wherein the dopant compound comprises $GeCl_4$.

38. The method of claim 37, wherein a fuel combusted to provide the heating comprises CO.

* * * * *